US006424446B2

(12) United States Patent
Toyoda et al.

(10) Patent No.: US 6,424,446 B2
(45) Date of Patent: *Jul. 23, 2002

(54) OPTICAL SCANNER AND IMAGE FORMING APPARATUS

(75) Inventors: Koji Toyoda, Tokyo; Manabu Kato, Toda, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/577,610

(22) Filed: May 25, 2000

(30) Foreign Application Priority Data

May 28, 1999 (JP) .......................... 11-149585

(51) Int. Cl.$^7$ .............................. G02B 26/08
(52) U.S. Cl. ...................... 359/205; 359/206; 359/212; 359/216; 347/259
(58) Field of Search ................ 359/205–207, 359/212, 216–219; 347/258–261

(56) References Cited

U.S. PATENT DOCUMENTS

| 4,864,419 A | 9/1989 | Saito et al. ................. 358/300 |
| 5,182,575 A | 1/1993 | Kato et al. |
| 5,436,645 A | 7/1995 | Uemura et al. |
| 5,557,446 A | 9/1996 | Kato ......................... 359/206 |
| 5,889,606 A | 3/1999 | Toyoda ....................... 359/215 |
| 5,963,356 A | 10/1999 | Kato .......................... 359/216 |
| 5,966,161 A | 10/1999 | Kato .......................... 347/258 |
| 5,995,131 A | 11/1999 | Fujibayashi et al. ........ 347/258 |
| 6,038,053 A | 3/2000 | Kato .......................... 359/205 |

FOREIGN PATENT DOCUMENTS

| EP | 0 827 004 | 3/1998 |
| JP | 10-68903 | 3/1998 |

*Primary Examiner*—James Phan
(74) *Attorney, Agent, or Firm*—Fitzpatrick, Cella, Harper & Scinto

(57) ABSTRACT

An optical scanner comprises a light source for emitting a light beam, an optical deflector for deflecting the light beam and a scanning optical system for focusing the deflected light beam on a surface to be scanned. The scanning optical system has a diffracting section and a refracting section and may optionally have a reflector mirror or an optical filter. The illuminance distribution of the light beam is maintained to be substantially uniform on the surface to be scanned by offsetting the changes in the diffraction efficiency of the diffracting section, the transmittance of the refracting section, the reflectance of the reflector mirror and the transmittance of the optical mirror, due to the angle of view of the scanning optical system.

76 Claims, 8 Drawing Sheets

$P \neq P' \neq P''$

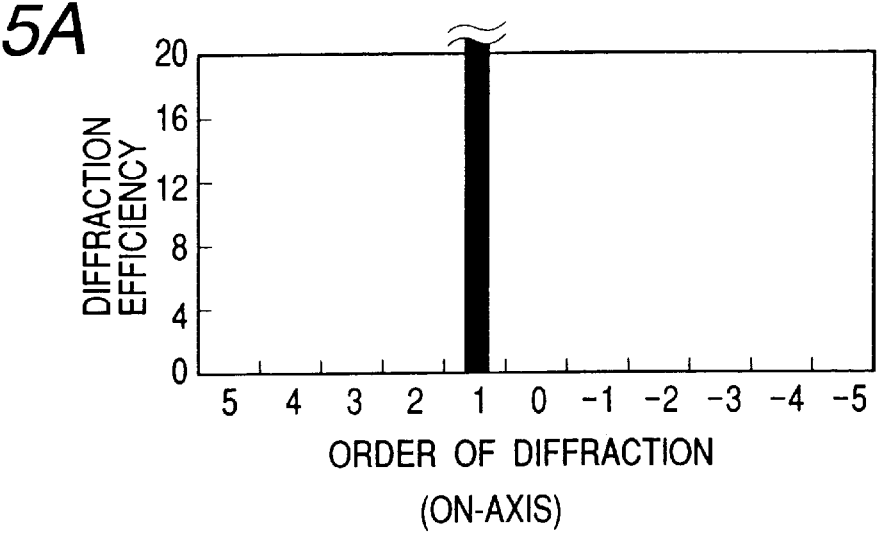
FIG. 5A (ON-AXIS)
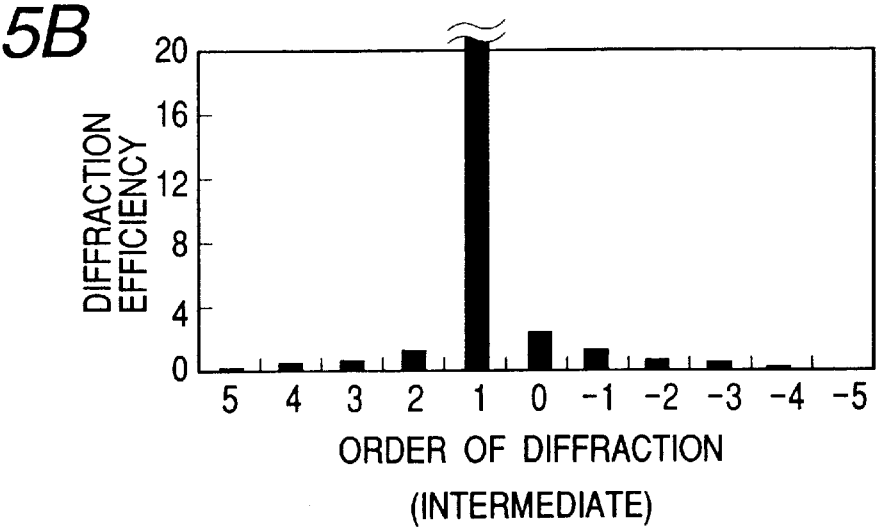
FIG. 5B (INTERMEDIATE)
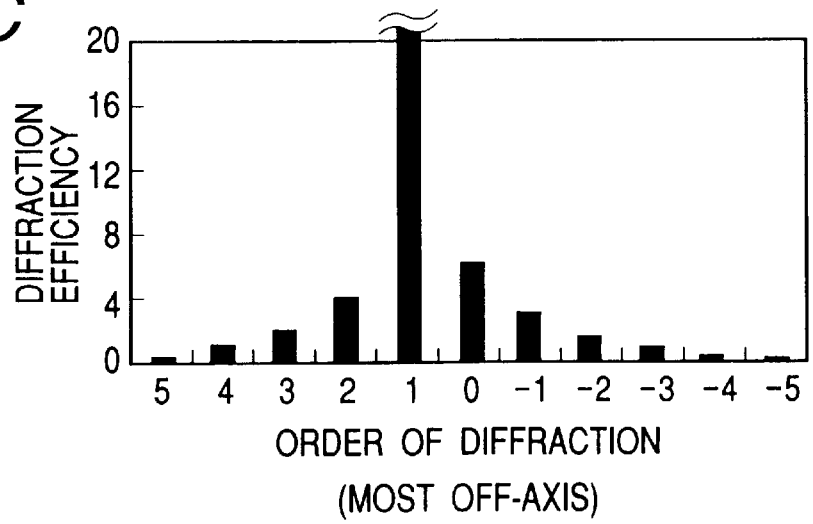
FIG. 5C (MOST OFF-AXIS)

OPTICAL SCANNER AND IMAGE FORMING APPARATUS

BACKGROUND OF THE INVENTION

1. Field of the Invention

This invention relates to an optical scanner and also to an image forming apparatus. More particularly, the present invention relates to an optical scanner comprising a scanning optical system including a diffracting section and a refracting section. Such an optical scanner can suitably be used for a laser beam printer (LBP) or a digital copying machine designed to form an image of an object.

2. Related Background Art

Optical scanners to be used for image-forming apparatus including laser beam printers and digital copying machines are adapted to deflect a light beam emitted from a light source in accordance with an image signal by means of an optical deflector, converge the deflected light beam to a spot of light on the surface to be scanned of a photosensitive drum by means of a scanning optical system and cause the light beam to scan the surface in order to form an image thereon.

Additionally, optical scanners comprising a scanning optical system having a diffracting section at least on a plane thereof are known. For examples, such an optical scanner is proposed in Japanese Patent Application Laid-Open No. 10-68903. According to the above patent document, a scanning optical element having a refracting section and a diffracting section is used for the scanning optical system. Fluctuations of the magnification and the focal point in the main-scanning direction due to the temperature fluctuations of the optical scanner can be corrected by changing the power of the refracting section and that of the diffracting section of the scanning optical element along with the wavelength of the semiconductor laser of the light source provided that the power of the refracting section and that of the diffracting section are so selected as to satisfy certain requirements. With this arrangement, finely defined images can be obtained even when the ambient temperature fluctuates.

For a scanning optical system having a diffracting section to generate necessary power by diffraction, the pitch of the diffraction grating 20 have to be varied in a manner as shown in FIG. 1 of the accompanying drawings. For instance, a convex power or a concave power can be realized by making the pitch of the diffraction grating 20 vary as a function of the distance from the optical axis. The diffracting section proposed in the above Japanese Patent Application Laid-Open No. 10-68903 is designed to generate a convex power by making the pitch of the diffraction grating diminish as a function of the distance from the optical axis in the main-scanning direction in order to achieve a desired imaging performance.

Generally, as the pitch of diffraction grating is reduced, so increases the intensity of diffracted light of the unnecessary orders of diffraction relative to that of diffracted light of the necessary orders of diffraction. This means that the quantity of diffracted light of the unnecessary orders of diffraction increases and hence that of diffracted light of the necessary orders of diffraction decreases. Then, as a matter of course, after passing through the diffracting section, the quantity of light of diffracted light of the necessary orders of diffraction decreases relative to the quantity of light entering the diffracting section. Therefore, when causing the scanning optical system to generate power by diffraction in a manner as described above, its diffraction efficiency of the diffracting section decreases as a function of the distance from the optical axis so that consequently the illuminance distribution to which the diffracting section is responsible is reduced.

Another factor that affects the illuminance distribution is the surface reflection of the various optical planes of the scanning optical system. FIG. 2 is a graph illustrating the angle dependency of the reflectance and the transmittance of an optical member showing a refractive index of 1.525 when an S-polarized light beam is made to enter the optical member. The surface reflection of each of the optical planes increases as the angle of incidence increases. Therefore, because the angle of incidence generally increases as a function of the distance from the optical axis of a scanning optical means, the surface reflection also increases as a function of the distance to consequently lower the transmittance. Thus, when an S-polarized light beam is made to enter an scanning optical means having a diffracting section, both the transmittance and the diffraction efficiency falls as a function of the distance from the optical axis of the scanning optical means so that the illuminance distribution falls on the surface to be scanned also as a function of the distance. As a result, the output image is accompanied by the drawback that it is less dense in peripheral areas than in central areas.

SUMMARY OF THE INVENTION

In view of the above problem of the prior art, it is therefore the object of the present invention to provide an optical scanner that can provide a uniform illuminance distribution on the surface to be scanned so that it can output a high quality image if the scanning optical system of the optical scanner has a diffracting section and also provide an image forming apparatus comprising such an optical scanner.

According to the invention, the above object is achieved by providing an optical scanner comprising:

a light source;

an optical deflector for deflecting the light beam emitted from the light source; and a scanning optical system for focussing the light beam deflected by the optical deflector on a surface to be scanned, the scanning optical system having a diffracting section and a refracting section;

the illuminance distribution of the light beam being maintained to be substantially uniform on the surface to be scanned by offsetting the change in the diffraction efficiency of the diffracting section due to the angle of view of the scanning optical system and the change in the transmittance of the refracting section due to the angle of view of the scanning optical system.

In another aspect of the invention, there is also provided an optical scanner comprising:

a light source;

an optical deflector for deflecting the light beam emitted from the light source; and a scanning optical system for focussing the light beam deflected by the optical deflector on a surface to be scanned, the scanning optical system having a diffracting section, a refracting section and at least a reflector mirror;

the illuminance distribution of the light beam being maintained to be substantially uniform on the surface to be scanned by offsetting the change in the diffraction efficiency of the diffracting section due to the angle of view of the scanning optical system, the change in the transmittance of the refracting section due to the angle of view of the scanning optical system and the change in the reflectance of the reflector mirror due to the angle of view of the scanning optical system.

In still another aspect of the invention, there is also provided an optical scanner comprising:

a light source;

an optical deflector for deflecting the light beam emitted from the light source; and a scanning optical system for focussing the light beam deflected by the optical deflector on a surface to be scanned, the scanning optical system having a diffracting section, a refracting section and at least an optical filter;

the illuminance distribution of the light beam being maintained to be substantially uniform on the surface to be scanned by offsetting the change in the diffraction efficiency of the diffracting section due to the angle of view of the scanning optical system, the change in the transmittance of the refracting section due to the angle of view of the scanning optical system and the change in the transmittance of the optical filter due to the angle of view of the scanning optical system.

BRIEF DESCRIPTION OF THE DRAWINGS

FIGS. 5A, 5B and 5C are graphs showing the diffraction efficiency of diffracted light of the unnecessary orders in the optical scanner of FIG. 3.

DETAILED DESCRIPTION OF THE PREFERRED EMBODIMENTS

Embodiment 1

Figure 3:
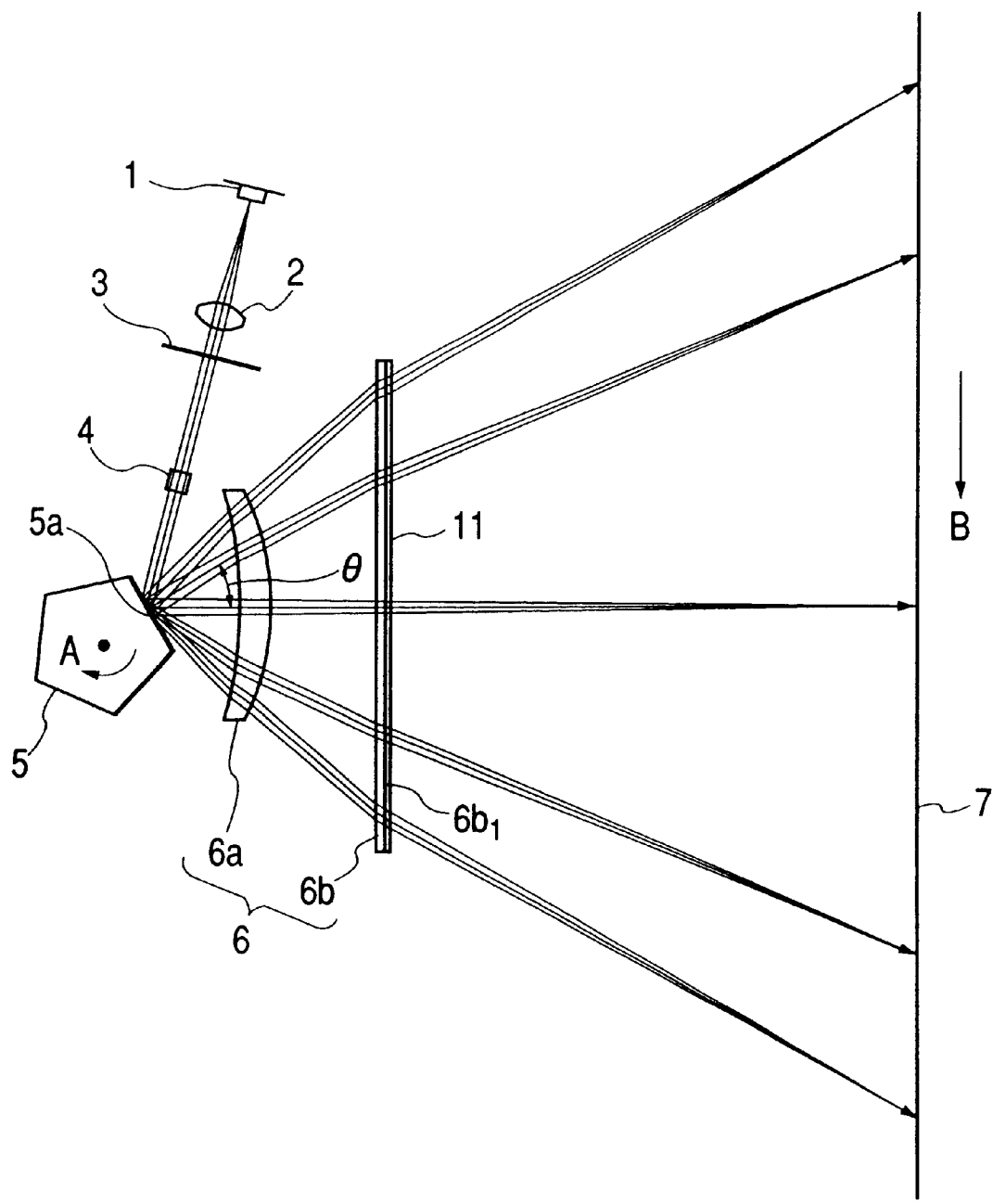
FIG. 3 is a schematic cross sectional view of a first embodiment of optical scanner according to the invention taken along the main-scanning direction.

FIG. 3 is a schematic cross sectional view of Embodiment 1 of optical scanner according to the invention taken along the main-scanning direction to illustrate a principal portion thereof, said embodiment being used in an image forming apparatus such as a laser beam printer or a digital copying machine.

Referring to FIG. 3, reference symbol 1 denotes a light source such as a semiconductor laser. In this embodiment, the light source (semiconductor laser) 1 is so arranged that the light beam entering scanning optical system 6, which will be described hereinafter, is P-polarized. In other words, the direction of the horizontal transverse mode of the light source (semiconductor laser) 1 is substantially parallel to the main-scanning section (i.e., a plane intersecting the light beam in the main-scanning direction).

The embodiment additionally comprises a collimator lens 2 for substantially collimating the divergent light beam emitted from the light source 1, an aperture stop 3 for making the light beam exiting from the collimator lens 2 show a desired optimal profile, a cylindrical lens (cylinder lens) showing a predetermined refractive power only in the sub-scanning direction so that the light beam is focussed at a position located close to the deflecting plane 5a of an optical deflector 5, which will be described hereinafter, in the sub-scanning section (i.e., a plane intersecting the light beam in the sub-scanning direction). Thus, a linear image extending in a plane intersecting the light beam in the main-scanning direction will be formed.

The optical deflector 5 is typically a polygon mirror (rotary polygon mirror) driven to rotate at a constant rate in the sense of arrow A in FIG. 3 by a drive means such as a motor (not shown).

Reference symbol 6 in FIG. 3 denotes a scanning optical system (scanning lens) having an fθ feature. It includes a first optical element (refraction element) 6a having at least a plane operating as refracting section and a second optical element (diffraction element) 6b having at least a plane operating as diffracting section. Additionally, the first optical element 6a has at least a curved surface operating as lens and showing refractive power. The first optical element 6a is typically a toric lens that has both of the surface at the side of the optical deflector (for receiving light) and the surface at the side of the surface to be scanned (for emitting light) curved and aspheric and shows refractive power differentiated between the main-scanning direction and the sub-scanning direction.

On the other hand, the second optical element 6b is a light-transmitting member provided wit h a refraction grating on the surface located at the side of the surface to be scanned. The surface of the second optical element 6b located at the side of the optical deflector is plane or curved to show refractive power. More specifically, the second optical element 6b is typically a diffraction element whose surface located at the side of the optical deflector (for receiving light) is aspherical and shows a predetermined power only in the main-scanning direction but no power in the sub-scanning direction, whereas the surface $6b_1$ of the diffraction element at the side of the surface to be scanned (for emitting light) is diffraction surface realized by adding a diffracting section (diffraction grating) 11 to a plane.

Both the first and second optical elements 6a and 6b are made of a plastic material. The scanning optical system 6 establishes a substantially conjugated relationship between the deflecting surface 5a of the optical deflector 5 and the surface to be scanned 7 in the sub-scanning section in order to correct any possible inclination of the deflecting plane. The surface to be scanned 7 is typically the surface of a photosensitive drum.

In this embodiment, the divergent light beam emitted from the light source (semiconductor laser) 1 is transformed into a substantially collimated light beam by the collimator lens 2 and then the light beam is trimmed to show a desired profile by the aperture stop 3 before entering the cylindrical lens 4. The substantially collimated light beam that enters the cylindrical lens 4 then leaves it without being modified in the main-scanning section but is converged in the sub-scanning section so that it is focussed on the deflection plane 5a of the optical deflector 5 to produce a substantially linear image (running along the main-scanning direction). The light beam reflected/deflected by the deflection plane 5a of the optical deflector 5 is then focussed to a spot on the surface to be scanned (the surface of the photosensitive drum) 7 by the first and second optical elements 6a and 6b and made to optically scan the latter in the direction indicated by arrow B (main-scanning direction) as the optical deflector 5 is driven to rotate in the sense of arrow B. As a result, an image is recorded on surface to be scanned (the surface of the photosensitive drum) 7 that is a recording medium.

Figure 4:
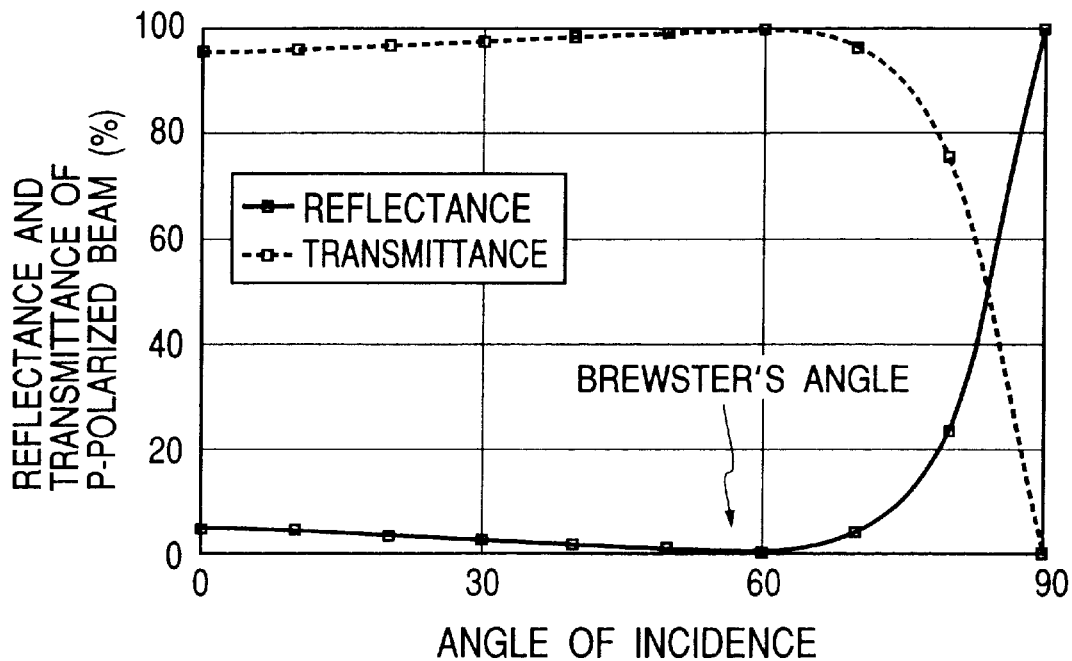
FIG. 4 is a graph showing the dependency of the reflectance and the transmittance of P-polarized light on the angle of incidence of light.

FIG. 4 is a graph showing the dependency of the reflectance and the transmittance of P-polarized light on the angle of incidence of light when the light beam is made to strike an optical member (refracting section) showing a refractive index of 1.525. It is clear from FIG. 4 that the reflectance of each optical surface (lens surface) falls as the angle of incidence increases until the latter gets to the Brewster's angle, when the reflectance becomes equal to nil. After passing the Brewster's angle, however, the reflectance rises as the angle of incidence increases.

In a scanning optical system, although the angle of incidence generally increases in the main-scanning direction as a function of the distance from the optical axis, it does not exceed the Brewster's angle. In this embodiment too, the angle of incidence is always found to be short of Brewster's angle within the scanning zone. Therefore, the surface reflectance of each optical surface of the refracting section falls as a function of the distance from the optical axis, whereas the transmittance rises as a function of the distance from the optical axis.

In this embodiment, the second surface $6b_1$ of the second optical element 6b of the scanning optical system 6 located at the side of the surface to be scanned is provided with a diffracting section (diffraction grating) 11, which is made to show a convex power. In other words, the pitch of bar arrangement of the diffraction grating decreases as a function of the distance from the optical axis in the main-scanning direction. As pointed out earlier, the intensity of diffracted light of the unnecessary orders increases relative to that of diffracted light of the orders to be used for the operation of the embodiment as the pitch of bar arrangement of the diffraction grating decreases.

FIGS. 5A, 5B and 5C are graphs showing the diffraction efficiency of diffracted light of unnecessary orders in the diffracting section 11 of the optical scanner of FIG. 3. While diffracted light of the first order is used in this embodiment, the intensity of diffracted light of each of the $-1^{st}$ order, $-2^{nd}$ order, ..., $2^{nd}$ order, $3^{rd}$ order, ... increases relative to that of diffracted light of the $1^{st}$ order as a function of the distance from the optical axis as shown in FIGS. 5A through 5C. Therefore, as the diffraction efficiency of diffracted light of the $1^{st}$ order falls as a function of the distance from the optical axis, the illuminance distribution of the light beam on the surface to be scanned also falls as a function of the distance from the optical axis due to the provision of the diffracting section 11.

If the diffraction efficiency of the diffracting section for the angle of view θ (as defined by the optical axis of the scanning optical system 6 and the principal ray of light of the light beam reflected/deflected by the optical deflector 5) is Id(θ) and the transmittance of the refracting section is It(θ), the illuminance attributable to the diffraction efficiency of the diffracting section can be expressed by Id(θ)/Id(0) when normalized on the optical axis, while the illuminance attributable to the transmittance of the refracting section can be expressed by It(θ)/It(0) when normalized on the optical axis, where Id(0) is the diffraction efficiency of the diffracting section when the angle of view is equal to zero or as viewed along the optical axis and It(0) is the transmittance of the refracting section when the angle of view is equal to zero or as viewed along the optical axis. From these, the ultimate illuminance of the light beam on the surface to be scanned 7 is expressed by the formula below when normalized on the optical axis.

$$\{Id(\theta) \times It(\theta)\}/\{Id(0) \times It(0)\}$$

In order to obtain a high quality image, it is desirable that the illuminance distribution is found within ±20% on the surface to be scanned 7. Thus, in this embodiment, the requirement of formula (1) below is met in the scanning angle of view.

$$0.8 < \{Id(\theta) \times It(\theta)\}/\{Id(0) \times It(0)\} < 1.2 \tag{1}$$

More specifically, in this embodiment, because of the fact that the diffraction efficiency of the diffracting section falls as a function of the distance from the optical axis, the transmittance of the refracting section is made to increase as a function of the distance from the optical axis by P-polarizing the light beam entering the scanning optical system 6 so that the changes in a plurality of optical characteristics as a function of the angle of view are offset in the overall optical systems and the requirement of formula (1) above is met.

Figure 6:
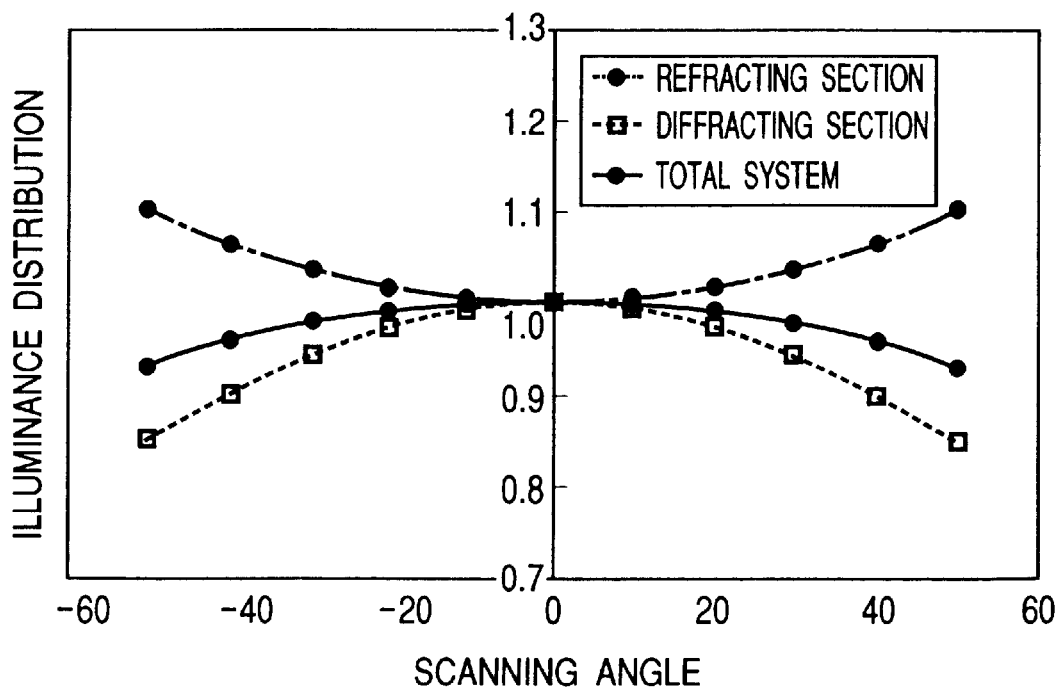
FIG. 6 is a graph showing the illuminance distribution on the surface to be scanned of the optical scanner of FIG. 3.

FIG. 6 is a graph showing the transmittance of the refracting section and the diffraction efficiency of the diffracting section of the scanning optical system 6 along with the ultimate illuminance distribution on the surface to be scanned 7 of the optical scanner of FIG. 3.

Thus, in this embodiment, the change in the diffraction efficiency of the diffracting section and the change in the transmittance of the refracting section of the scanning optical system 6 as a function of the angle of view θ are made to offset each other so that the illuminance distribution on the surface to be scanned 7 can be made substantially uniform as shown in FIG. 6 to obtain a high quality image.

Embodiment 2

Figure 7:
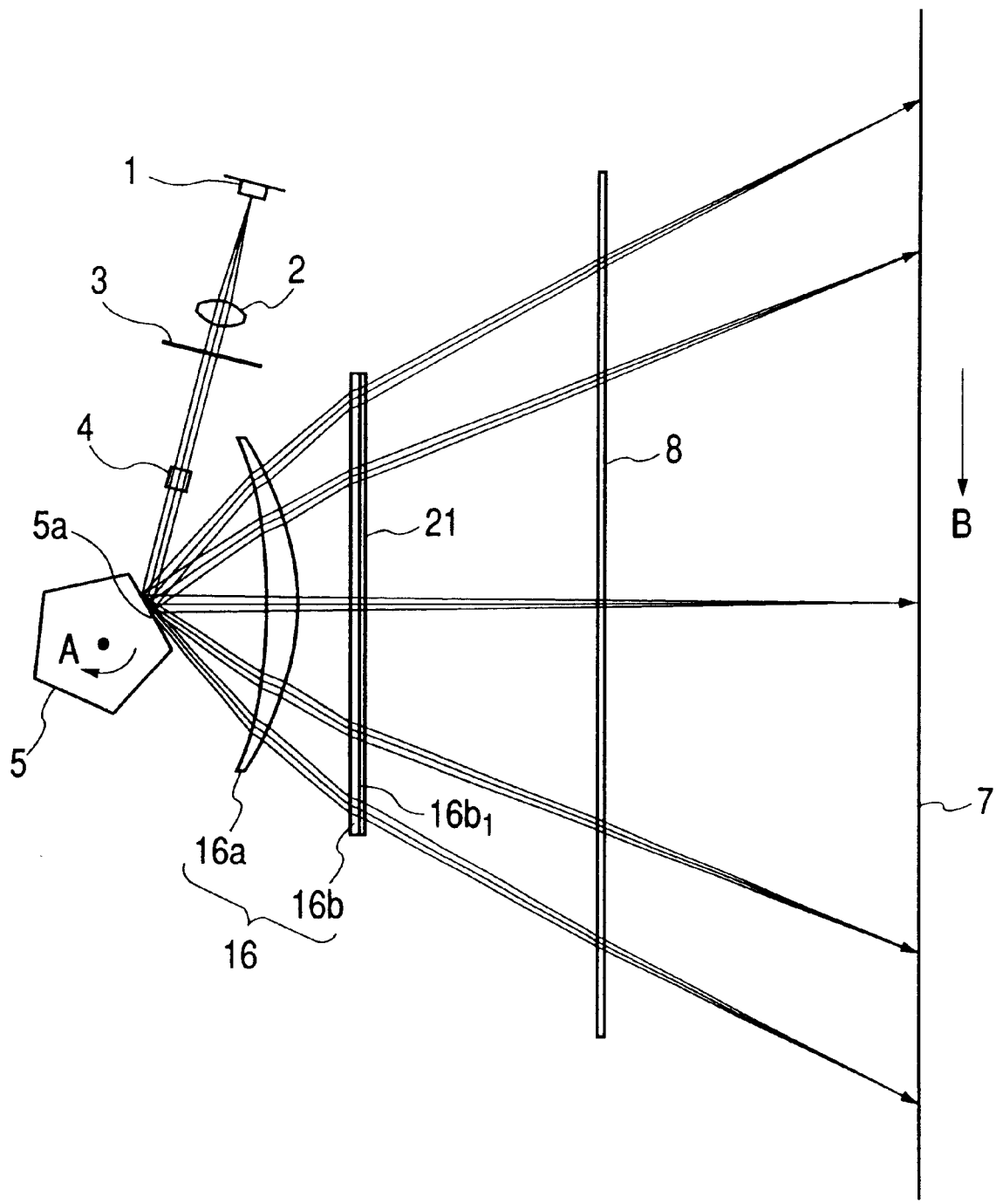
FIG. 7 is a schematic cross sectional view of a second embodiment of optical scanner according to the invention taken along the main-scanning direction.

FIG. 7 is a schematic cross sectional view of Embodiment 2 of optical scanner according to the invention taken along the main-scanning direction to illustrate a principal portion thereof, said embodiment being used in an image forming apparatus such as a laser beam printer or a digital copying machine. Note that the components same as those of FIG. 3 are denoted respectively by the same reference symbols and are not described here any further.

This embodiment differs from the above described Embodiment 1 in that a fold (reflector) mirror 8 is arranged on the optical path between the scanning optical system 16 and the surface to be scanned 7 as reflection means whose reflectance is angle-dependent and the scanning optical system 16 is made more powerful in terms of the diffracting section 21. Otherwise, the configuration and the optical effects of this embodiment are similar to those of Embodiment 1 so that this embodiment operates as effectively as Embodiment 1.

The scanning optical system 16 having an fθ feature includes a toric lens 16a that has both of the surface at the side of the optical deflector (for receiving light) and the surface at the side of the surface to be scanned (for emitting light) curved and aspheric and shows refractive power differentiated between the main-scanning direction and the sub-scanning direction and a diffraction element 16b whose surface located at the side of the optical deflector (for receiving light) is aspherical and shows a predetermined power only in the main-scanning direction but no power in the sub-scanning direction, whereas the surface $6b_1$ located at the side of the surface to be scanned (for emitting light) is diffraction surface realized by adding a diffracting section (diffraction grating) 21 to a plane. Note that the ratio of the power of the refracting section to that of the diffracting section of the scanning optical system 16 of this embodiment is greater than the corresponding ratio of the scanning optical system 6 of Embodiment 1.

Thus, in this embodiment, the pitch of bar arrangement of the diffraction grating has to become higher as the power of the diffracting section 21 increases. Then, as the pitch of bar arrangement of the diffraction grating becomes higher, the diffraction efficiency of diffracted light of the first order used for the operation of the optical scanner falls. Since the highest pitch of bar arrangement of the diffraction grating of this embodiment is higher than that of Embodiment 1 and hence the fall of the diffraction efficiency is very large, it is no longer possible to offset the change in the diffraction efficiency by the change in the transmittance of the refracting section even if a P-polarized light beam is used.

In this embodiment, a fold (refractor) mirror 8 whose reflectance varies depending on the angle of incidence of light is arranged on the optical path between the scanning optical system 16 and the surface to be scanned 7 and the reflectance of the fold mirror 8 is made to increase as a function of the distance from the optical axis in order to assist the refracting section for offsetting the fall of the diffraction efficiency. As a result, a substantially uniform illuminance distribution is obtained by the overall optical system of this embodiment.

In this embodiment, if the diffraction efficiency of the diffracting section for the angle of view θ is Id(θ), the transmittance of the refracting section is It(θ) and the reflectance of the fold mirror 8 is Ir(θ), the illuminance attributable to the diffraction efficiency of the diffracting section can be expressed by Id(θ)/Id(0) when normalized on the optical axis and the illuminance attributable to the transmittance of the refracting section can be expressed by It(θ)/It(0) when normalized on the optical axis while the illuminance attributable to the reflectance of the fold mirror 8 can be expressed by Ir(0)/Ir(0), where Ir(0) is the reflectance of the fold mirror 8 when the angle of view is equal to zero or as viewed along the optical axis. From these, the ultimate illuminance of the light beam on the surface to be scanned 7 is expressed by the formula below when normalized on the optical axis.

$$\{Id(\theta) \times It(\theta) \times Ir(\theta)\}/\{Id(0) \times It(0) \times Ir(0)\}$$

In order to obtain a high quality image, it is desirable that the illuminance distribution is found within ±20% on the surface to be scanned 7. Thus, in this embodiment, the requirement of formula (2) below is met in the scanning angle of view.

$$0.8 < \{Id(\theta) \times It(\theta) \times Ir(\theta)\}/\{Id(0) \times It(0) \times Ir(0)\} < 1.2 \quad (2)$$

More specifically, in this embodiment, because of the fact that the diffraction efficiency of the diffracting section falls as a function of the distance from the optical axis, the transmittance of the refracting section is made to increase as a function of the distance from the optical axis by P-polarizing the light beam entering the scanning optical system 16 and the reflectance of the fold mirror 8 is also made to increase as a function of the distance from the optical axis so that the changes in a plurality of optical characteristics as a function of the angle of view are offset in the overall optical systems and the requirement of formula (2) above is met.

Figure 8:
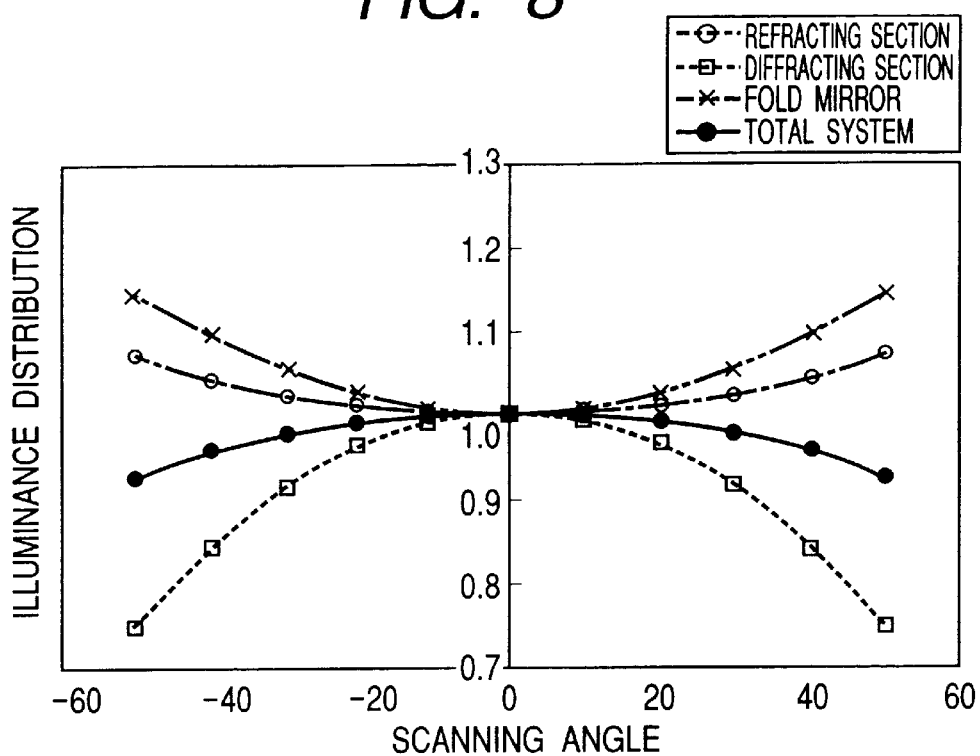
FIG. 8 is a graph showing the illuminance distribution on the surface to be scanned of the optical scanner of FIG. 7.

FIG. 8 is a graph showing the transmittance of the refracting section and the diffraction efficiency of the diffracting section of the scanning optical system 16 along with the ultimate illuminance distribution on the surface to be scanned 7 of the optical scanner of FIG. 7.

Thus, in this embodiment, the change in the diffraction efficiency of the diffracting section as a function of the angle of view θ is offset by the change in the transmittance of the refracting section of the scanning optical system 16 and the change in the reflectance of the fold mirror 8 as a function of the angle of view θ so that the illuminance distribution on the surface to be scanned 7 can be made substantially uniform as shown in FIG. 8 to obtain a high quality image.

Embodiment 3

Figure 9:
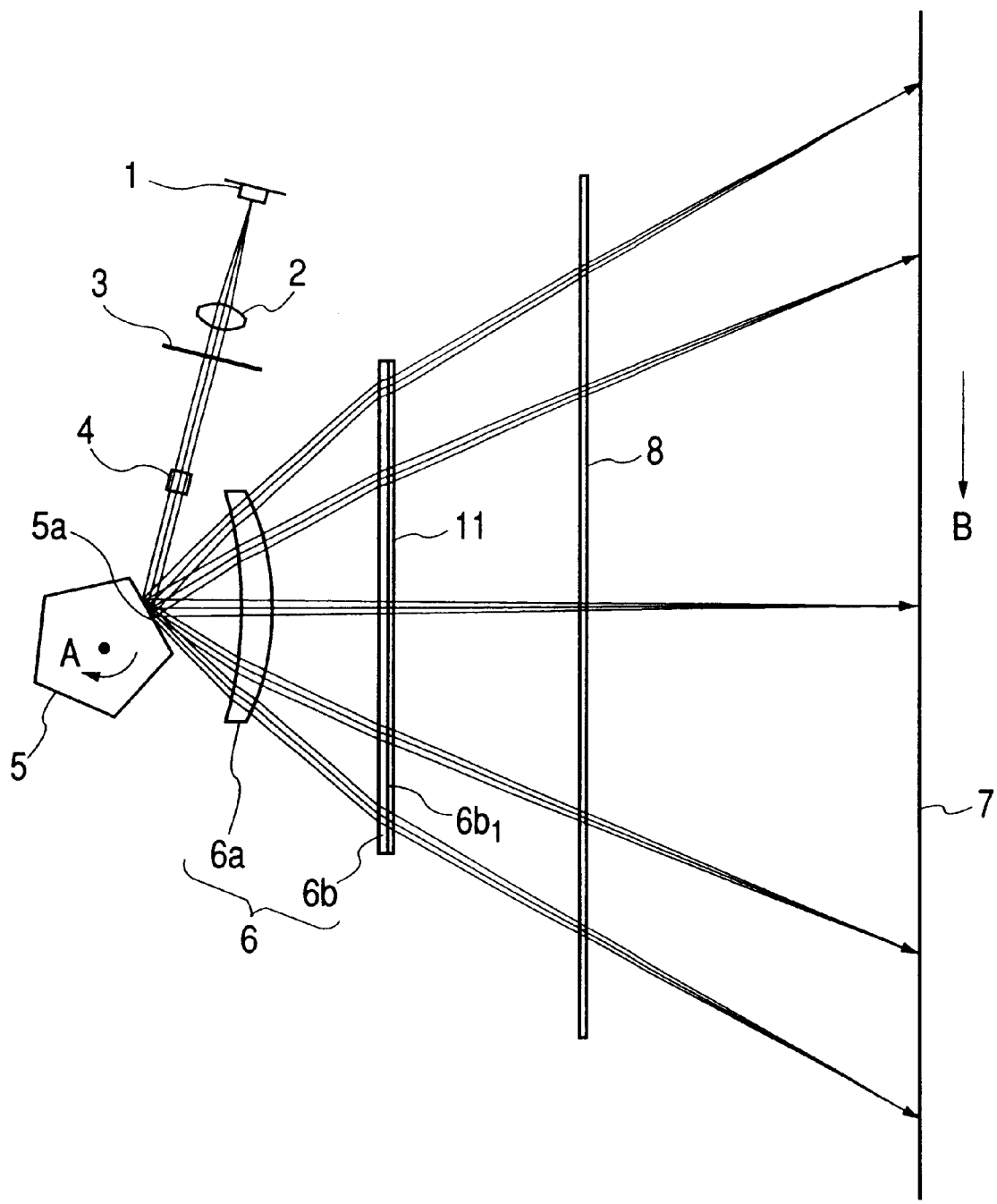
FIG. 9 is a schematic cross sectional view of a third embodiment of optical scanner according to the invention taken along the main-scanning direction.

FIG. 9 is a schematic cross sectional view of Embodiment 3 of optical scanner according to the invention taken along the main-scanning direction to illustrate a principal portion thereof, said embodiment being used in an image forming apparatus such as a laser beam printer or a digital copying machine. Note that the components same as those of FIGS. 3 and 7 are denoted respectively by the same reference symbols and are not described here any further.

This embodiment differs from the above described Embodiment 1 in that a fold (reflector) mirror 8 is arranged on the optical path between the scanning optical system 6 and the surface to be scanned 7 as reflection means whose reflectance is angle-dependent and the light source (semiconductor laser) 1 is arranged in such a way that the light beam entering the scanning optical system 6 is S-polarized. Otherwise, the configuration and the optical effects of this embodiment are similar to those of Embodiment 1 so that this embodiment operates as effectively as Embodiment 1.

In other words, the light source (semiconductor laser) 1 of this embodiment is so arranged that the horizontal transverse mode of the light source (semiconductor laser) 1 is found to be substantially perpendicular to the main-scanning section.

Figure 1:
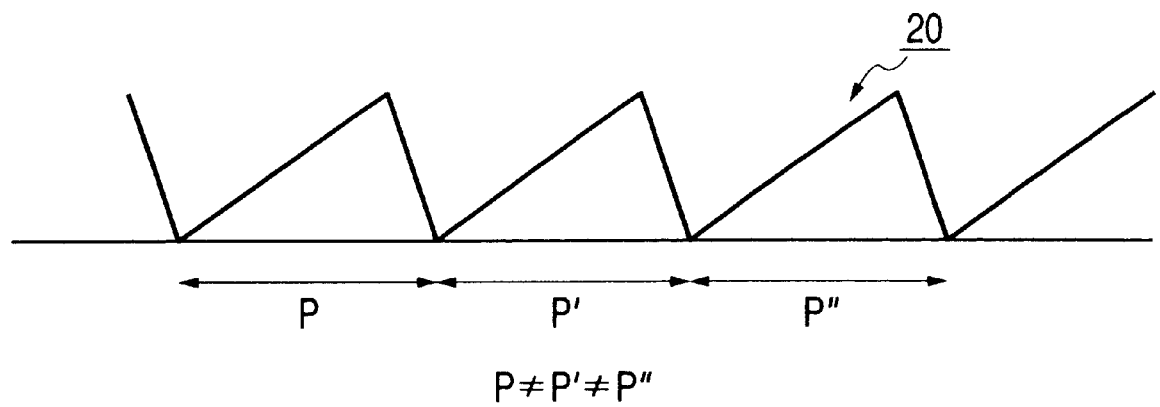
FIG. 1 is a schematic illustration of the diffraction grating used in a known optical scanner.
Figure 2:
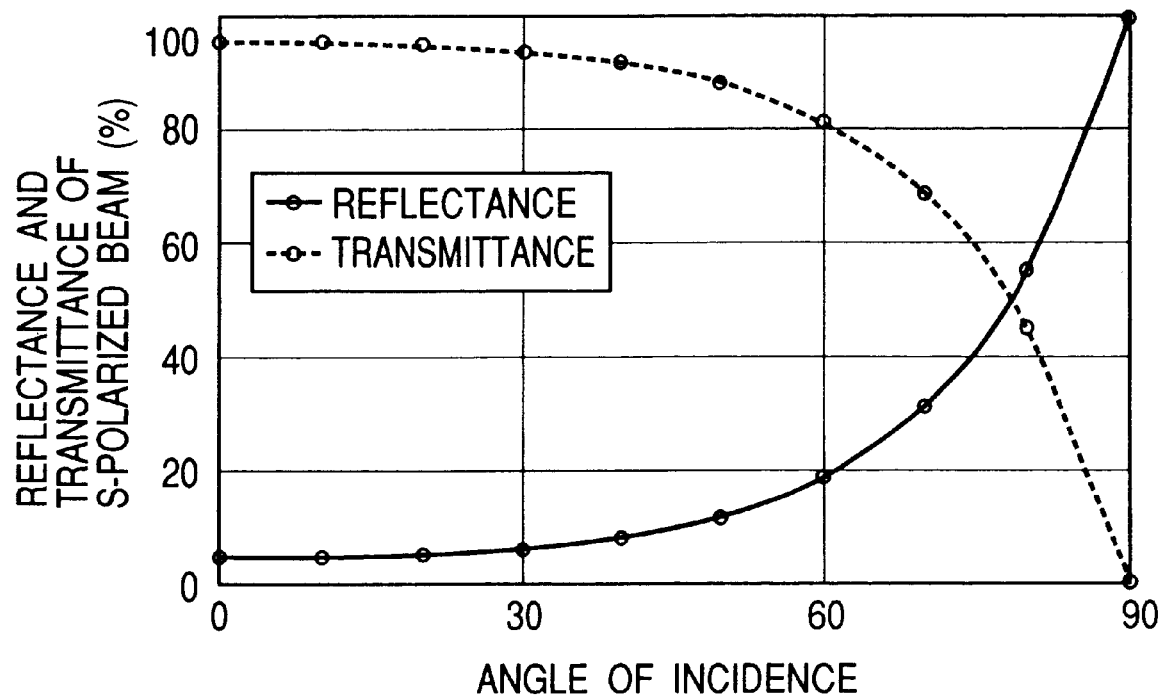
FIG. 2 is a graph showing the dependency of the reflectance and the transmittance of S-polarized light on the angle of incidence of light.

Thus, since an S-polarized light beam is used in this embodiment, the reflectance of each optical plane increases as a function of the distance from the optical axis as shown in FIG. 2. Then, the transmittance of the refracting section falls as a function of the distance from the optical axis. Additionally, the diffraction efficiency of diffracting section also falls as a function of the distance from the optical axis. Therefore, the illuminance distribution on the surface to be scanned as determined by the transmittance of the refracting section and the diffraction efficiency of the diffracting section falls as a function of the distance from the optical axis in an accelerated manner.

In this embodiment, a fold (refractor) mirror 8 whose reflectance varies depending on the angle of incidence of light is arranged on the optical path between the scanning optical means 6 and the surface to be scanned 7 and the reflectance of the fold mirror 8 is made to increase as a function of the distance from the optical axis so that, as a result, a substantially uniform illuminance distribution is obtained by the overall optical system of this embodiment.

In this embodiment, as in Embodiment 2, if the diffraction efficiency of the diffracting section for the angle of view θ is Id(θ), the transmittance of the refracting section is It(θ) and the reflectance of the fold mirror 8 is Ir(θ), the illuminance attributable to the diffraction efficiency of the diffracting section can be expressed by Id(θ)/Id(0) when normalized on the optical axis and the illuminance attributable to the transmittance of the refracting section can be expressed by It(θ)/It(0) when normalized on the optical axis while the illuminance attributable to the reflectance of the fold mirror 8 can be expressed by Ir(θ)/Ir(0). From these, the ultimate illuminance of the light beam on the surface to be scanned 7 is expressed by the formula below when normalized on the optical axis.

$$\{Id(\theta) \times It(\theta) \times Ir(\theta)\}/\{Id(0) \times It(0) \times Ir(0)\}$$

In order to obtain a high quality image, it is desirable that the illuminance distribution is found within ±20% on the surface to be scanned 7. Thus, in this embodiment, the requirement of formula (2) below is met in the scanning angle of view.

$$0.8 < \{Id(\theta) \times It(\theta) \times Ir(\theta)\}/\{Id(0) \times It(0) \times Ir(0)\} < 1.2 \quad (2)$$

More specifically, in this embodiment, because the light beam entering the scanning optical means 6 is S-polarized, both the diffraction efficiency of the diffracting and the transmittance of the refracting section falls as a function of the distance from the optical axis. Therefore, in this embodiment, the reflectance of the fold mirror 8 is made to increase as a function of the distance from the optical axis so that the changes in a plurality of optical characteristics as a function of the angle of view are offset in the overall optical systems and the requirement of formula (2) above is met.

Figure 10:
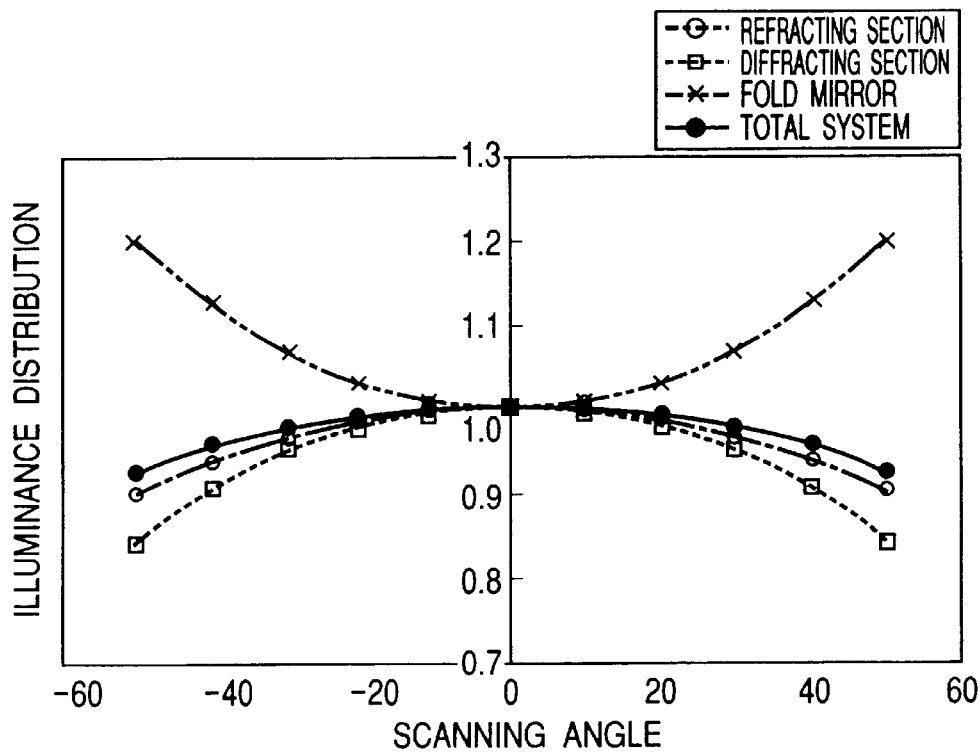
FIG. 10 is a graph showing the illuminance distribution on the surface to be scanned of the optical scanner of FIG. 9.

FIG. 10 is a graph showing the transmittance of the refracting section and the diffraction efficiency of the diffracting section of the scanning optical system 6 along with the ultimate illuminance distribution on the surface to be scanned 7 of the optical scanner of FIG. 9.

Thus, in this embodiment, the change in the diffraction efficiency of the diffracting section as a function of the angle of view θ and the change in the transmittance of the refracting section of the scanning optical system 6 are offset by the change in the reflectance of the fold mirror 8 as a function of the angle of view θ so that the illuminance distribution on the surface to be scanned 7 can be made substantially uniform as shown in FIG. 10 to obtain a high quality image.

While the variances of the scanning speed on the surface to be scanned due to the insufficient correction of fθ function and the resultant variances of the illuminance distribution are not considered in the above described embodiments, it is also possible to produce a uniform illuminance distribution by taking the scanning speed into consideration.

While the light beam is polarized in a direction substantially parallel or perpendicular to the surface to be scanned in each of the above embodiments, the present invention is by no means limited thereto and the light beam may alternatively be polarized with an appropriate angle relative to the surface to be scanned for realizing a uniform illuminance distribution.

While a fold mirror (reflection means) is arranged on the optical path between the optical deflector and the surface to be scanned in the above described Embodiments 2 and 3, it may be replaced by an optical filter (e.g., ND filter) whose transmittance varies as a function of angle of view to realize the effects of Embodiment 2 and 3.

More specifically, in the case of using a filter, if the diffraction efficiency of the diffracting section for the angle of view θ is Id(θ), the transmittance of the refracting section is It(θ) and that of the optical filter is If(θ), the illuminance attributable to the diffraction efficiency can be expressed by Id(θ)/Id(0) when normalized on the optical axis and the illuminance attributable to the transmittance of the refracting section can be expressed by It(θ)/It(0) when normalized on the optical axis while the illuminance attributable to the transmittance of the filter can be expressed by If(θ)/If(0), where If(0) is the transmittance of the optical filter when the angle of view is equal to zero or as viewed along the optical axis. From these, the ultimate illuminance of the light beam on the surface to be scanned 7 is expressed by the formula below when normalized on the optical axis.

$$\{Id(\theta) \times It(\theta) \times If(\theta)\}/\{Id(O) \times It(O) \times If(O)\}$$

In order to obtain a high quality image, it is desirable that the illuminance distribution is found within ±20% on the surface to be scanned as described above. Thus, the requirement of formula (2) below is met in the scanning angle of view.

$$0.8 < \{Id(\theta) \times It(\theta) \times If(\theta)\}/\{Id(0) \times It(0) \times If(0)\} < 1.2 \quad (3)$$

Thus, when the fold (refractor) mirror is replaced by an optical filter, the change in the diffraction efficiency of the diffracting section as a function of the angle of view θ, the change in the transmittance of the refracting section and the change in the transmittance of the optical filter as a function of the angle of view θ are offset among them so that the illuminance distribution on the surface to be scanned can be maintained to be substantially uniform even if the diffracting section is used in the scanning optical means.

Additionally, both a fold (reflector) mirror and an optical filter may be used and the change in the diffraction efficiency of the diffracting section as a function of the angle of view θ is offset by the change in the transmittance of the refracting section and the change in the transmittance of the fold mirror along with the change in the transmittance of the optical filter as a function of the angle of view θ.

While the scanning optical system comprises two optical elements, that are respectively a diffracting section and a refracting section, in each of the above described embodiments, the present invention is by no means limited thereto and it may be so arranged that the scanning optical system comprises only a single optical element that includes a diffracting section and a refracting section.

While the light source is a semiconductor laser adapted to emit a single light beam in each of the above described embodiments, the semiconductor laser may be replaced by a multi-beam semiconductor laser adapted to emit a plurality of light beams simultaneously.

In each of the above described embodiments, fluctuations of the magnification and the focal point in both the main- and sub-scanning directions due to the temperature fluctuations of the optical scanner are corrected by changing the power of the refracting section and that of the diffracting section of the scanning optical element along with the wavelength of the semiconductor laser of the light source.

An optical scanner according to the invention and described above can suitably be used for an image forming apparatus such as a laser beam printer (LBP) or a digital copying machine. This will be described by referring to FIG. 11.

Figure 11:
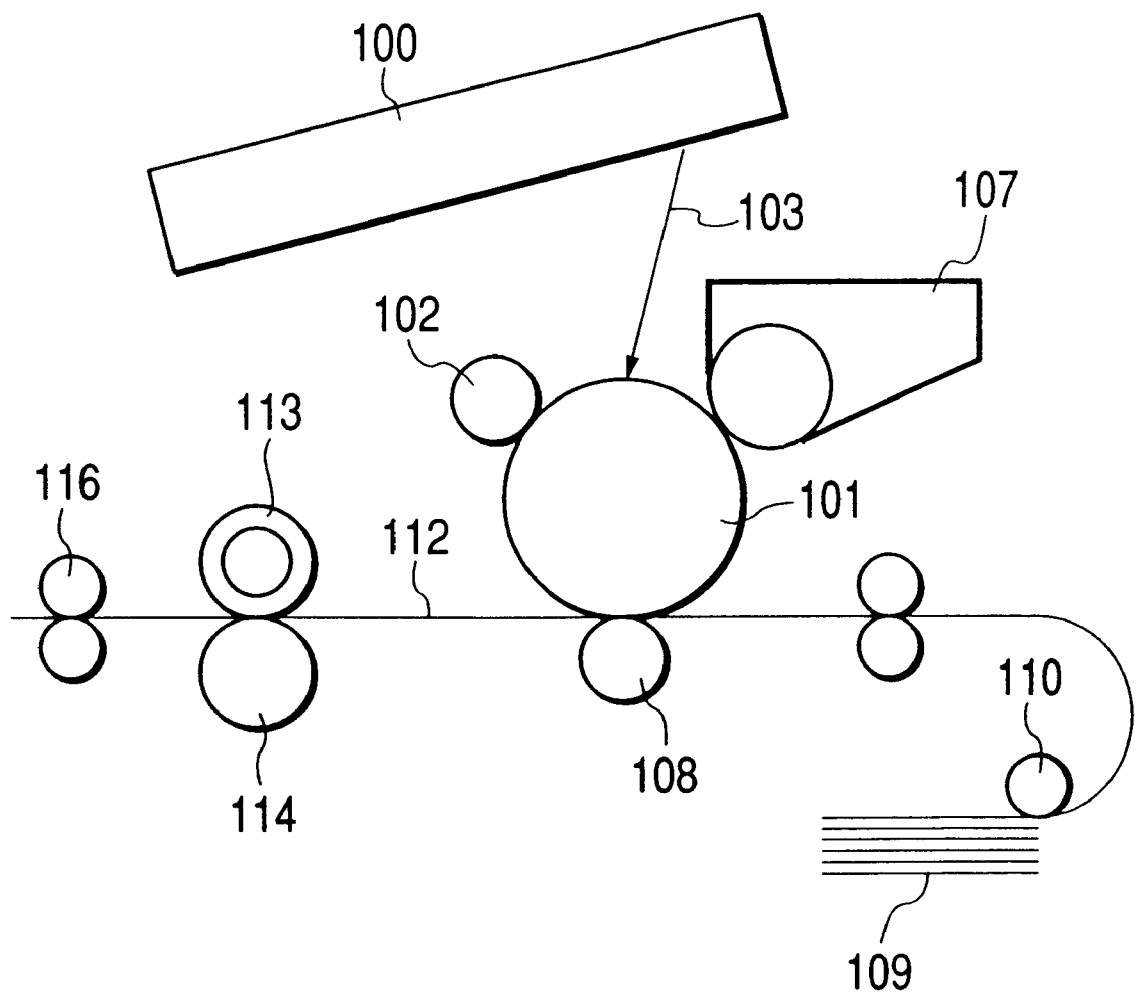
FIG. 11 is a schematic cross sectional view of an image forming apparatus comprising one of the first through third embodiments of optical scanner taken along the sub-scanning direction.

FIG. 11 is a schematic cross sectional view of an image forming apparatus comprising one of the first through third embodiments of optical scanner taken along the sub-scanning direction. In FIG. 11, reference numeral 100 denotes an optical scanner according to the invention, which may be any of the first through third embodiments. Reference numeral 101 denotes a photosensitive drum operating as an electrostatic latent image carrier. A charging roller 102 adapted to charge the surface of the photosensitive drum 101 uniformly with electricity is arranged above and held in contact with the photosensitive drum 101. The electrically charged area of the surface of the photosensitive drum 101 located downstream relative to the contact line of the charging roller 102 and the drum 101 is scanned by the light beam 103 emitted from the optical scanner 100.

The light beam 103 is modulated according to the image data applied to the optical scanner so that an electrostatic latent image is formed on the surface of the photosensitive drum 101 as the latter is irradiated with the light beam 103. The electrostatic latent image is then developed into a toner image by means of a developing device 107 arranged downstream relative to the area of the photosensitive drum 101 irradiated with the light beam 103 in the sense of rotation of the drum 101 and also held in contact with the photosensitive drum 101. The toner image is then transferred onto a sheet of paper 112 by a transfer roller 108 arranged vis-a-vis the photosensitive drum 101 at a position below the latter. The sheet of paper 112 is fed from a sheet cassette 109 arranged in front of the photosensitive drum 101 (right to the drum 101 in FIG. 11), although it may alternatively be fed with hand. A feed roller 110 is arranged at an end of the sheet cassette 109 and adapted to feed a sheet of paper at a time from the cassette 109 to the transfer route.

Then, the sheet 112 now carrying the unfixed toner image is moved to a fixing device located behind the photosensitive drum 101 (left to the drum 101 in FIG. 11). The fixing device comprises a fixing roller 113 provided in the inside with fixing heater (not shown) and a press roller 114 for pressing the fixing roller 113 so that the toner image on the sheet 112 moved from the transfer section is fixed as the sheet is pressed and heated between the fixing roller 113 and the press roller 114. A pair of delivery rollers 116 are arranged behind the fixing roller 113 to deliver the sheet 112 now carrying a fixed image to the outside of the image forming apparatus.

The present invention can find various applications besides the above described embodiments. The present invention covers any such applications without departing from the scope of the invention specifically defined by the appended claims.

What is claimed is:

1. An optical scanner comprising:

a light source;

an optical deflector for deflecting the light beam emitted from said light source; and a scanning optical system for focussing the light beam deflected by said optical deflector on a surface to be scanned, said scanning optical system having a diffracting section and a refracting section;

the illuminance distribution of the light beam being maintained to be substantially uniform on the surface to be scanned by offsetting the change in the diffraction efficiency of the diffracting section due to the angle of view of said scanning optical system and the change in the transmittance of the refracting section due to the angle of view of said scanning optical system.

2. An optical scanner according to claim 1, wherein said light source is so arranged that the sense of polarization of the light beam emitted from the light source causes the change in the diffraction efficiency of the diffracting section due to the angle of view of said scanning optical system to be offset by the change in the transmittance of the refracting section due to the angle of view of said scanning optical system.

3. An optical scanner according to claim 1, wherein said light source is so arranged that the sense of polarization of the light beam emitted from the light source is substantially parallel to the main-scanning section.

4. An optical scanner according to claim 1, wherein, if the angle of view of the scanning optical system is $\theta$, the diffraction efficiency of the diffracting section is $Id(\theta)$ for the angle of view $\theta$ and the transmittance of the refracting section is $It(\theta)$ for the angle of view $\theta$, the requirement of $$0.8 < \{Id(\theta) \times It(\theta)\} / \{Id(0) \times It(0)\} < 1.2$$

is satisfied.

5. An optical scanner according to claim 1, wherein said light source comprises a semiconductor laser.

6. An optical scanner according to claim 1, wherein said scanning optical system includes a first optical element having at least a surface operating as the refracting section and a second optical element having at least a surface operating as the diffracting section.

7. An optical scanner according to claim 6, wherein said first and second optical elements are made of a plastic material.

8. An optical scanner according to claim 1, further comprising:

an optical system of incident light for focussing the light beam emitted from said light source on the deflecting plane of said optical deflector as a linear image extending in the main-scanning direction.

9. An optical scanner according to claim 8, wherein said scanning optical system establishes an optically conjugated relationship between the deflecting plane of the optical deflector and the surface to be scanned in the sub-scanning direction perpendicular to the main-scanning direction.

10. An optical scanner according to claim 8, wherein said optical system of incident light includes a collimator lens for collimating the light beam emitted from the light source and a cylindrical lens for focussing the collimated light beam on the deflecting plane of the optical deflector as a linear image extending in the main-scanning direction.

11. An optical scanner according to claim 1, wherein said optical deflector comprises a polygon mirror.

12. An optical scanner comprising:

a light source;

an optical deflector for deflecting the light beam emitted from said light source; and a scanning optical system for focussing the light beam deflected by said optical deflector on a surface to be scanned, said scanning optical system having a diffracting section, a refracting section and at least a reflector mirror;

the illuminance distribution of the light beam being maintained to be substantially uniform on the surface to be scanned by offsetting the change in the diffraction efficiency of the diffracting section due to the angle of view of said scanning optical system, the change in the transmittance of the refracting section due to the angle of view of said scanning optical system and the change in the reflectance of the reflector mirror due to the angle of view of said scanning optical system.

13. An optical scanner according to claim 12, wherein said light source is so arranged that the sense of polarization of the light beam emitted from the light source causes the change in the diffraction efficiency of the diffracting section due to the angle of view of said scanning optical system, the change in the transmittance of the refracting section due to the angle of view of said scanning optical system and the change in the reflectance of the reflector mirror due to the angle of view of said scanning optical system to offset each other.

14. An optical scanner according to claim 12, wherein said light source is so arranged that the sense of polarization of the light beam emitted from the light source is substantially parallel to the main-scanning section.

15. An optical scanner according to claim 12, wherein, if the angle of view of the scanning optical system is θ, the diffraction efficiency of the diffracting section is Id(θ) for the angle of view θ, the transmittance of the refracting section is It(θ) for the angle of view θ and the reflectance of the reflector mirror is Ir(θ) for the angle of view θ, the requirement of $$0.8 < \{Id(\theta) \times It(\theta) \times Ir(\theta)\}/\{Id(0) \times It(0) \times Ir(0)\} < 1.2$$

is satisfied.

16. An optical scanner according to claim 12, wherein said light source comprises a semiconductor laser.

17. An optical scanner according to claim 12, wherein said scanning optical system includes a first optical element having at least a surface operating as the refracting section and a second optical element having at least a surface operating as the diffracting section.

18. An optical scanner according to claim 17, wherein said first and second optical elements are made of a plastic material.

19. An optical scanner according to claim 12, further comprising:
an optical system of incident light for focussing the light beam emitted from said light source on the deflecting plane of said optical deflector a s a linear image extending in the main-scanning direction.

20. An optical scanner according to claim 19, wherein said scanning optical system establishes an optically conjugated relationship between the deflecting plane of the optical deflector and the surface to be scanned in the sub-scanning direction perpendicular to the main-scanning direction.

21. An optical scanner according to claim 19, wherein said optical system of incident light includes a collimator lens for collimating the light beam emitted from the light source and a cylindrical lens for focussing the collimated light beam on the deflecting plane of the optical deflector as a linear image extending in the main-scanning direction.

22. An optical scanner according to claim 12, wherein said optical deflector comprises a polygon mirror.

23. An optical scanner comprising:
a light source;
an optical deflector for deflecting the light beam emitted from said light source; and
a scanning optical system for focussing the light beam deflected by said optical deflector on a surface to be scanned, said scanning optical system having a diffracting section, a refracting section and at least an optical filter;
the illuminance distribution of the light beam being maintained to be substantially uniform on the surface to be scanned by offsetting the change in the diffraction efficiency of the diffracting section due to the angle of view of said scanning optical system, the change in the transmittance of the refracting section due to the angle of view of said scanning optical system and the change in the transmittance of the optical filter due to the angle of view of said scanning optical system.

24. An optical scanner according to claim 23, wherein said light source is so arranged that the sense of polarization of the light beam emitted from the light source causes the change in the diffraction efficiency of the diffracting section due to the angle of view of said scanning optical system, the change in the transmittance of the refracting section due to the angle of view of said scanning optical system and the change in the transmittance of the optical filter due to the angle of view of said scanning optical system to offset each other.

25. An optical scanner according to claim 23, wherein said light source is so arranged that the sense of polarization of the light beam emitted from the light source is substantially parallel to the main-scanning section.

26. An optical scanner according to claim 23, wherein, if the angle of view of the scanning optical system is θ, the diffraction efficiency of the diffracting section is Id(θ) for the angle of view θ, the transmittance of the refracting section is It(θ) for the angle of view θ and the transmittance of the optical filter is If(θ) for the angle of view θ, the requirement of $$0.8 < \{Id(\theta) \times It(\theta) \times If(\theta)\}/\{Id(0) \times It(0) \times If(0)\} < 1.2$$

is satisfied.

27. An optical scanner according to claim 23, wherein said light source comprises a semiconductor laser.

28. An optical scanner according to claim 23, wherein said scanning optical system includes a first optical element having at least a surface operating as the refracting section and a second optical element having at least a surface operating as the diffracting section.

29. An optical scanner according to claim 28, wherein said first and second optical elements are made of a plastic material.

30. An optical scanner according to claim 23, further comprising:
an optical system of incident light for focussing the light beam emitted from said light source on the deflecting plane of said optical deflector as a linear image extending in the main-scanning direction.

31. An optical scanner according to claim 30, wherein said scanning optical system establishes an optically conjugated relationship between the deflecting plane of the optical deflector and the surface to be scanned in the sub-scanning direction perpendicular to the main-scanning direction.

32. An optical scanner according to claim 30, wherein said optical system of incident light includes a collimator lens for collimating the light beam emitted from the light source and a cylindrical lens for focussing the collimated light beam on the deflecting plane of the optical deflector as a linear image extending in the main-scanning direction.

33. An optical scanner according to claim 23, wherein said optical deflector comprises a polygon mirror.

34. An image forming apparatus comprising:
an optical scanner according to any of claims 1 through 33;
a photosensitive member arranged on the surface to be scanned of said optical scanner;
a developing device for developing the electrostatic latent image formed on said photosensitive member as a result of a scanning operation using the light beam into a toner image;
a transfer device for transferring the developed toner image on a sheet of paper; and
a fixing device for fixing the transferred toner image to the sheet of paper.

35. An optical scanner comprising:
a light source;
an optical deflector for deflecting the light beam emitted from said light source; and
a scanning optical system for focussing the light beam deflected by said optical deflector on a surface to be scanned, said scanning optical system having a diffracting section and a refracting section,
the diffraction efficiency of the diffracting section due to the angle of view of said scanning optical system changing in the opposite direction to the change in the transmittance of the refracting section due to the angle of view of said scanning optical system within the scanning range such that the illuminance distribution of the light beam is made substantially uniform on the surface to be scanned.

36. An optical scanner according to claim 35, wherein said light source is so arranged that the sense of polarization of the light beam emitted from the light source causes the diffraction efficiency of the diffracting section due to the angle of view of said scanning optical system to change in the opposite direction to the change in the transmittance of the refracting section due to the angle of view of said scanning optical system.

37. An optical scanner according to claim 35, wherein said light source is so arranged that the sense of polarization of the light beam emitted from the light source is substantially parallel to the main-scanning section.

38. An optical scanner according to claim 35, wherein, if the angle of view of the scanning optical system is θ, the diffraction efficiency of the diffracting section is Id(θ) for the angle of view θ and the transmittance of the refracting section is It(θ) for the angle of view θ, the requirement of $$0.8 < \{Id(\theta) \times It(\theta)\}/\{Id(0) \times It(0)\} < 1.2$$

is satisfied.

39. An optical scanner according to claim 35, wherein said light source comprises a semiconductor laser.

40. An optical scanner according to claim 35, wherein said scanning optical system includes a first optical element having at least a surface operating as the refracting section and a second optical element having at least a surface operating as the diffracting section.

41. An optical scanner according to claim 40, wherein said first and second optical elements are made of a plastic material.

42. An optical scanner according to claim 35, further comprising:
an optical system of incident light for focussing the light beam emitted from said light source on the deflecting plane of said optical deflector as a linear image extending in the main-scanning direction.

43. An optical scanner according to claim 42, wherein said scanning optical system establishes an optically conjugated relationship between the deflecting plane of the optical deflector and the surface to be scanned in the sub-scanning direction perpendicular to the main-scanning direction.

44. An optical scanner according to claim 42, wherein said optical system of incident light includes a collimator lens for collimating the light beam emitted from the light source and a cylindrical lens for focussing the collimated light beam on the deflecting plane of the optical deflector as a linear image extending in the main-scanning direction.

45. An optical scanner according to claim 35, wherein said optical deflector comprises a polygon mirror.

46. An optical scanner comprising:
a light source;
an optical deflector for deflecting the light beam emitted from said light source; and
a scanning optical system for focussing the light beam deflected by said optical deflector on a surface to be scanned, said scanning optical system having a diffracting section, a refracting section and at least a reflector mirror,
the diffraction efficiency of the diffracting section due to the angle of view of said scanning optical system changing in the opposite direction to the change in the transmittance of the refracting section due to the angle of view of said scanning optical system and the change in the reflectance of the reflector mirror due to the angle of view of said scanning optical system within the scanning the range such that the illuminance distribution of the light beam is made substantially uniform on the surface to be scanned.

47. An optical scanner according to claim 46, wherein said light source is so arranged that the sense of polarization of the light beam emitted from the light source causes the diffraction efficiency of the diffracting section due to the angle of view of said scanning optical system to change in the opposite direction to the change in the transmittance of the refracting section due to the angle of view of said scanning optical system and the change in the reflectance of the reflector mirror due to the angle of view of said scanning optical system.

48. An optical scanner according to claim 46, wherein said light source is so arranged that the sense of polarization of the light beam emitted from the light source is substantially parallel to the main-scanning section.

49. An optical scanner according to claim 46, wherein, if the angle of view of the scanning optical system is θ, the diffraction efficiency of the diffracting section is Id(θ) for the angle of view θ, the transmittance of the refracting section is It(θ) for the angle of view θ and the reflectance of the reflector mirror is Ir(θ) for the angle of view θ, the requirement of $$0.8 < \{Id(\theta) \times It(\theta) \times Ir(\theta)\}/\{Id(0) \times It(0) \times Ir(0)\} < 1.2$$

is satisfied.

50. An optical scanner according to claim 46, wherein said light source comprises a semiconductor laser.

51. An optical scanner according to claim 46, wherein said scanning optical system includes a first optical element having at least a surface operating as the refracting section and a second optical element having at least a surface operating as the diffracting section.

52. An optical scanner according to claim 51, wherein said first and second optical elements are made of a plastic material.

53. An optical scanner according to claim 46, further comprising:

an optical system of incident light for focussing the light beam emitted from said light source on the deflecting plane of said optical deflector as a linear image extending in the main-scanning direction.

54. An optical scanner according to claim 53, wherein said scanning optical system establishes an optically conjugated relationship between the deflecting plane of the optical deflector and the surface to be scanned in the sub-scanning direction perpendicular to the main-scanning direction.

55. An optical scanner according to claim 53, wherein said optical system of incident light includes a collimator lens for collimating the light beam emitted from the light source and a cylindrical lens for focussing the collimated light beam on the deflecting plane of the optical deflector as a linear image extending in the main-scanning direction.

56. An optical scanner according to claim 46, wherein said optical deflector comprises a polygon mirror.

57. An optical scanner comprising:

a light source;

an optical deflector for deflecting the light beam emitted from said light source; and a scanning optical system for focussing the light beam deflected by said optical deflector on a surface to be scanned, said scanning optical system having a diffracting section, a refracting section and at least an optical filter, the diffraction efficiency of the diffracting section due to the angle of view of said scanning optical system changing in the opposite direction to the change in the transmittance of the refracting section due to the angle of view of said scanning optical system and the change in the transmittance of the optical filter due to the angle of view of said scanning optical system within the scanning range such that the illuminance distribution of the light beam is made substantially uniform on the surface to be scanned.

58. An optical scanner according to claim 57, wherein said light source is so arranged that the sense of polarization of the light beam emitted from the light source causes the diffraction efficiency of the diffracting section due to the angle of view of said scanning optical system to change in the opposite direction to the change in the transmittance of the refracting section due to the angle of view of said scanning optical system and the change in the transmittance of the optical filter due to the angle of view of said scanning optical system.

59. An optical scanner according to claim 57, wherein said light source is so arranged that the sense of polarization of the light beam emitted from the light source is substantially parallel to the main-scanning section.

60. An optical scanner according to claim 57, wherein, if the angle of view of the scanning optical system is θ, the diffraction efficiency of the diffracting section is Id(θ) for the angle of view θ, the transmittance of the refracting section is It(θ) for the angle of view θ and the transmittance of the optical filter is If(θ) for the angle of view θ, the requirement of $$0.8 < \{Id(\theta) \times It(\theta) \times If(\theta)\}/\{Id(0) \times It(0) \times If(0)\} < 1.2$$

is satisfied.

61. An optical scanner according to claim 57, wherein said light source comprises a semiconductor laser.

62. An optical scanner according to claim 57, wherein said scanning optical system includes a first optical element having at least a surface operating as the refracting section and a second optical element having at least a surface operating as the diffracting section.

63. An optical scanner according to claim 62, wherein said first and second optical elements are made of a plastic material.

64. An optical scanner according to claim 57, further comprising:

an optical system of incident light for focussing the light beam emitted from said light source on the deflecting plane of said optical deflector as a linear image extending in the main-scanning direction.

65. An optical scanner according to claim 64, wherein said scanning optical system establishes an optically conjugated relationship between the deflecting plane of the optical deflector and the surface to be scanned in the sub-scanning direction perpendicular to the main-scanning direction.

66. An optical scanner according to claim 64, wherein said optical system of incident light includes a collimator lens for collimating the light beam emitted from the light source and a cylindrical lens for focussing the collimated light beam on the deflecting plane of the optical deflector as a linear image extending in the main-scanning direction.

67. An optical scanner according to claim 57, wherein said optical deflector comprises a polygon mirror.

68. An image forming apparatus comprising:

an optical scanner according to any of claims 35 through 67;

a photodetector member arranged on the surface to be scanned of said optical scanner;

a developing device for developing the electrostatic latent image formed on said photosensitive member as a result of a scanning operation using the light beam into a toner image;

a transfer device for transferring the developed toner image on a sheet of paper; and a fixing device for fixing the transferred toner image to the sheet of paper.

69. An optical scanner comprising:

a light source;

an optical deflector for deflecting the light beam emitted from said light source; and a scanning optical system for focusing the light beam deflected by said optical deflector on a surface to be scanned, said scanning optical system having a diffracting section and a refracting section, wherein the diffraction efficiency of the diffracting section changes in the opposite direction to the change in the transmittance of the refracting section within the scanning range due to the angle of view of said scanning optical system.

70. An optical scanner according to claim 69, wherein, if the angle of view of the scanning optical system is θ, the diffraction efficiency of the diffracting section is Id(θ) for the angle of view θ and the transmittance of the refracting section is It(θ) for the angle of view θ, the requirement of $$0.8 < \{Id(\theta) \times It(\theta)\}/\{Id(0) \times It(0)\} < 1.2$$

is satisfied.

71. An optical scanner according to claim 69, wherein said scanning optical system has a reflector mirror arranged on the optical path between the optical deflector and the surface to be scanned and the diffraction efficiency of the diffracting section changes in the opposite direction to the change in the transmittance of the refracting section and the change in the reflectance of the reflector mirror due to the angle of view of said scanning optical system.

72. An optical scanner according to claim 71, wherein, if the angle of view of the scanning optical system is θ, the diffraction efficiency of the diffracting section is Id(θ) for the angle of view θ, the transmittance of the refracting section is It(θ) for the angle of view θ and the reflectance of the reflector mirror is Ir(θ) for the angle of view θ, the requirement of $$0.8 < \{Id(\theta) \times It(\theta) \times Ir(\theta)\}/\{Id(0) \times It(0) \times Ir(0)\} < 1.2$$

is satisfied.

73. An optical scanner according to claim 69, wherein said scanning optical system has an optical filter reflector mirror arranged on the optical path between the optical deflector and the surface to be scanned and the diffraction efficiency of the diffracting section changes in the opposite direction to the change in the transmittance of the refracting section and the change in the transmittance of the optical filter due to the angle of view of said scanning optical system.

74. An optical scanner according to claim 73, wherein, if the angle of view of the scanning optical system is θ, the diffraction efficiency of the diffracting section is Id(θ) for the angle of view θ, the transmittance of the refracting section is It(θ) for the angle of view θ and the transmittance of the optical filter is If(θ) for the angle of view θ, the requirement of $$0.8 < \{Id(\theta) \times It(\theta) \times If(\theta)\}/\{Id(0) \times It(0) \times If(0)\} < 1.2$$

is satisfied.

75. An optical scanner according to claim 69, wherein said light source is so arranged that the sense of polarization of the light beam emitted from the light source is substantially parallel to a plane intersecting the light beam in the main-scanning direction.

76. An image forming apparatus comprising:
an optical scanner according to any of claims 69 through 75;
a photosensitive member arranged on the surface to be scanned of the optical scanner;
a developing device for developing the electrostatic latent image formed on the photosensitive member as a result of a scanning operation using the light beam into a toner image;
a transfer device for transferring the developed toner image on a sheet of paper; and
a fixing device for fixing the transferred toner image to the sheet of paper.

* * * * *

UNITED STATES PATENT AND TRADEMARK OFFICE
CERTIFICATE OF CORRECTION

PATENT NO. : 6,424,446 B2
DATED : July 23, 2002
INVENTOR(S) : Koji Toyoda et al.

It is certified that error appears in the above-identified patent and that said Letters Patent is hereby corrected as shown below:

Column 4,
Line 42, "wit h" should read -- with --.

Column 7,
Line 51, "Ir(0)/Ir(0)," should read -- Ir($\theta$)/Ir(0), --.

Column 10,
Line 19, "/{Id(O)xIt(O)xIf(O)}" should read -- /{Id(0)xIt(0)xIf(0)} --.

Column 13,
Line 46, "a s" should read -- as --.

Signed and Sealed this

Eighteenth Day of February, 2003

JAMES E. ROGAN
*Director of the United States Patent and Trademark Office*